Aug. 18, 1964 T. P. BOTHWELL ETAL 3,145,309

UNIVERSAL LOGICAL PACKAGE HAVING MEANS PREVENTING CLOCK-PULSE SPLITTING

Filed March 15, 1961 2 Sheets-Sheet 1

*INVENTORS*
THEODORE PAUL BOTHWELL
JOSEPH L. DECLUE
*BY*
*Weingarten, Orenbuch, & Pandiscio*
ATTORNEYS Aug. 18, 1964 T. P. BOTHWELL ETAL 3,145,309

UNIVERSAL LOGICAL PACKAGE HAVING MEANS PREVENTING CLOCK-PULSE SPLITTING

Filed March 15, 1961 2 Sheets-Sheet 2

INVENTORS
THEODORE PAUL BOTHWELL
JOSEPH L. DECLUE

BY

*Weingarten, Orenbuch, & Pandiscio*

ATTORNEYS

United States Patent Office 3,145,309

Patented Aug. 18, 1964

3,145,309
UNIVERSAL LOGICAL PACKAGE HAVING MEANS PREVENTING CLOCK-PULSE SPLITTING

Theodore Paul Bothwell, Natick, and Joseph L. De Clue, Medfield, Mass., assignors to Computer Control Company, Inc., a corporation of Delaware Filed Mar. 15, 1961, Ser. No. 95,948
4 Claims. (Cl. 307—88.5)

Figure 1:
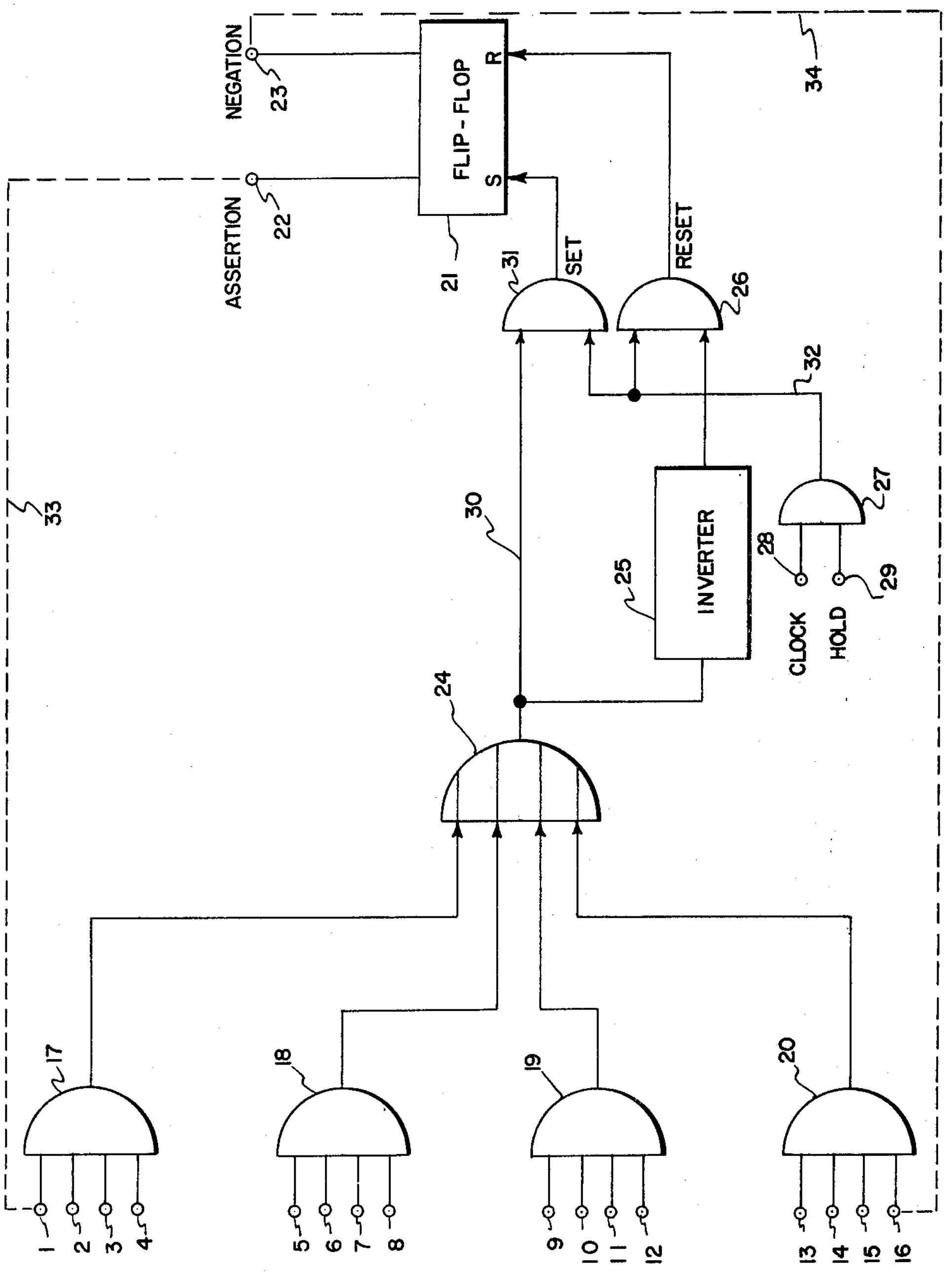

This invention relates in general to high speed electronic computing apparatus and more particularly pertains to a logical element capable of serving as the fundamental building block from which can be constructed almost any type of high speed digital computing electronic system.

A universal logical member capable of operating at a rate of one megacycle per second is described in Patent No. 2,820,897. The present invention is an improved logical element for use in higher speed systems where the signals transmitted between logic elements may be D.C. levels rather than pulses.

The invention resides in an improved logical element employing non-return-to-zero information signals. The improved logical element is capable of performing logical operations at very high speeds and the signals transmitted between elements forming a static computer system are D.C. levels. Historically, dynamic systems have used return-to-zero signals. That is, dynamic systems have employed signals that represent binary "ones" or "zeros" by the presence or absence of pulses. In such systems, a pulse must rise before clock time and return to a reference level, usually the zero voltage level, before the next clock time. Return-to-zero dynamic systems, therefore, require their logical circuits to be capable of accommodating two transitions, one rise and one fall, for each bit of information. Non-return-to-zero signals, in contrast, represent information by two D.C. levels, binary "ones" being represented by one voltage level and binary "zeros" being represented by a different voltage level. In the non-return-to-zero system successive "ones" or successive "zeros" occur as continuous D.C. levels and do not require the signal to return to a different value between clock pulses. Therefore, non return to zero signals require at most a single transition from one D.C. level to another for each information bit. Where a short time interval is available for signal transitions, as is the case in high speed computers, non-return-to-zero signal representation requires less stringent control of signal rise and fall time, and with active circuit components having a fixed gain bandwidth product, non-return-to-zero operation can carried on at higher rates (i.e. higher clock frequencies) than is possible with return-to-zero operation.

The invention utilizes non-return-to-zero signals in a static logical element to achieve high operating rates. The invention is an improvement upon the logical arrangement described in copending application Serial No. 95,947 of William Horton entitled Universal Logical Element, filed of even date herewith. The invention of the copending application is embodied in a logical element having an input structure consisting of a number of AND gates. The input AND gates are arranged to provide one of two D.C. levels at their outputs, the D.C. level depending upon the manner in which the gate is conditioned by its inputs. In binary notation one D.C. level is represented by a ONE and the other D.C. level is represented by a ZERO. The input AND gates have their outputs connected through an OR gate to the input of a signal inverter. A pair of two-legged AND gates are arranged so that the output of one gate is coupled to the "set" input of a flip-flop and the output of the other gate is coupled to the flip-flop's "reset" input. Both of the two-legged AND gates have clock pulses applied to one of their inputs. The output of the OR gate is arranged to inhibit or to condition one of the two-legged AND gates to pass clock pulses and the output of the inverter is arranged to inhibit or to condition the other of those two gates to pass clock pulses. Where the output of the OR gate or the inverter is a ZERO, its associated two-legged AND gate is inhibited. Conversely, when the output of the OR gate or the inverter is a ONE, the associated AND gate is conditioned to pass clock pulses. This can be better understood by considering the outputs of the input AND gates to be signal sources. Since the input to the inverter is coupled through the OR gate to the signal sources, when any source signal is a ONE, the output of the OR gate is a ONE whereas the inverter's output is a ZERO. When all the source signals are ZERO, the inverter's output is a ONE. Therefore, where the output of the OR gate is a ZERO, one of the two-legged AND gates is inhibited and the other of those gates is at the same time conditioned to permit a clock pulse to "reset" the flip-flop. When the output of the OR gate is a ONE, the conditioning and inhibiting of the two-legged AND gates is reversed.

The invention herein disclosed accomplishes the same result as the above described arrangement without employing any element corresponding to the signal inverter. In accordance with the invention a flip-flop provides the output signals of the logical element. The input structure consists of a number of diode AND gates, each AND gate having its output connected to the base of a transistor. The AND gates are buffered to prevent one of those gates from affecting any other input gate. Each input AND gate is arranged to impress one of two potential levels on the base of its associated transistor, depending upon how the AND gate is conditioned by the signals applied to its input terminals. The outputs of the transistors are connected in common to one input of the flip-flop. The other input of the flip-flop is connected to the output of a transistor whose base is biased at a potential intermediate the two potential levels supplied by the input AND gates. A current source is coupled to all the transistors and simultaneously applies a pulse to the emitters of those transistors. When all the input AND gates are in one condition their associated transistors are reversely biased to an extent such that the current pulse passes through the transistor having its base biased at the intermediate potential. Conversely, when any of the input AND gates is in the other condition, its transistor is more forwardly biased and the current pulse passes through that transistor rather than through the transistor biased at the intermediate potential.

The organization of the invention and its mode of operation can be apprehended by a perusal of the following exposition when considered in conjunction with the accompanying drawings in which:

FIG. 1 illustrates a logical arrangement, and

Figure 2:
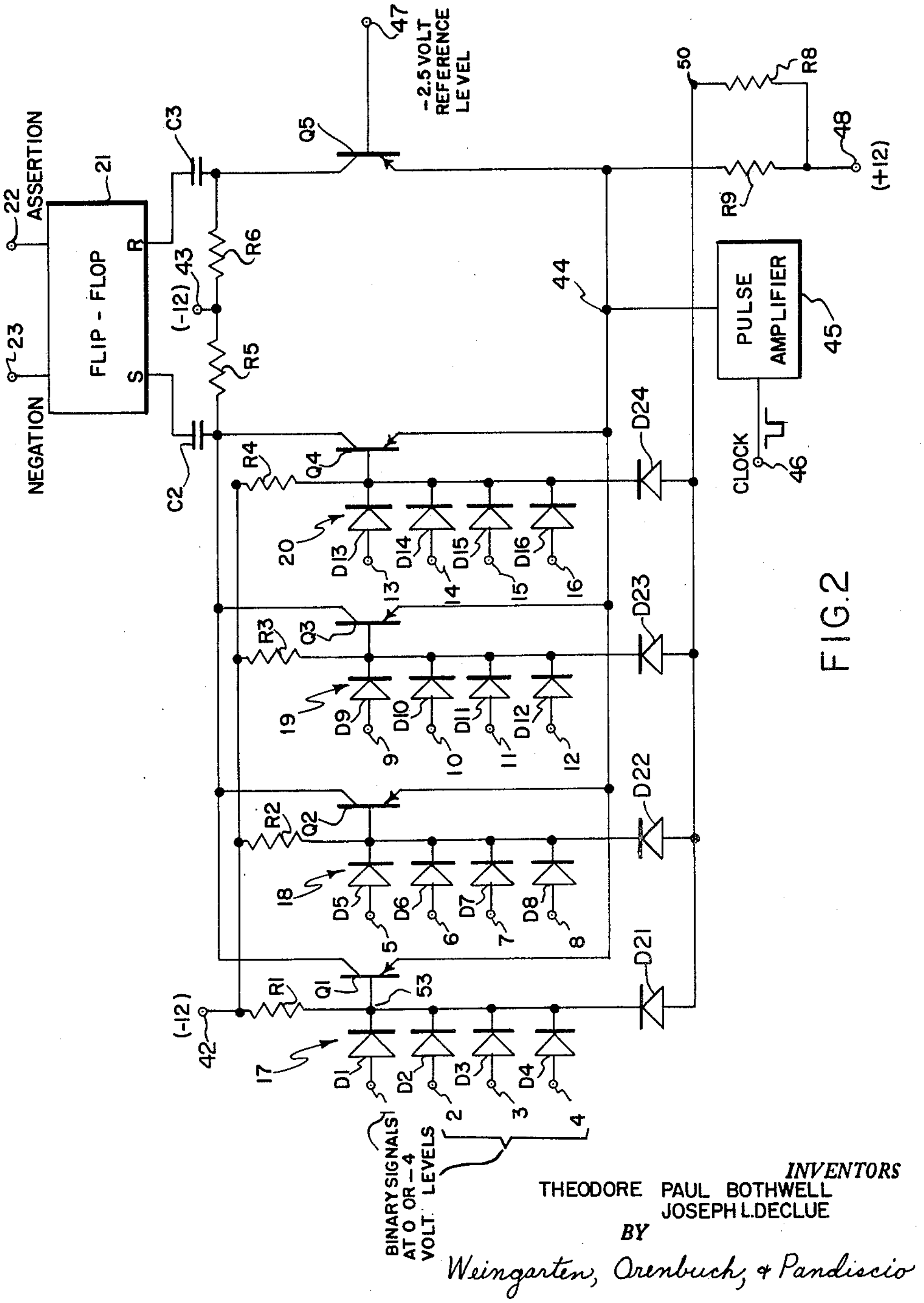

FIG. 2 schematically depicts an arrangement embodying the invention.

Referring now to FIG. 1, there is shown a logical arrangement of a digital circuit package capable of performing logical operations at high rates of speed. The outputs of the package are derived from a flip-flop 21 having output terminals 22 and 23, the signal obtained from terminal 22 being termed the assertion output and the signal obtained from terminal 23 being termed the negation output. The outputs of the package are of the non-return-to-zero type. That is, each output represents binary information by its D.C. level so that successive "ones" or successive "zeros" occur as continuous D.C. levels without the requirement that the signal return to a steady state between clock pulses. In a synchronous system, the clock pulse is the information sensing signal. The basic delay interval of such a system is the period between successive clock pulses. The width of the clock pulse establishes the time during which information is sensed. The clock pulse, of itself, carries no information from one circuit element to another.

The input structure of the logical package depicted in FIG. 1 consists of a number of AND gates, four such "AND" gates 17, 18, 19, 20 being shown by way of example. Each AND gate has four inputs, although the number of inputs may be reduced or increased, as desired. The input terminals of the four AND gates are designated, in consecutive order, 1 through 16. Gates 17 to 20 are arranged so that each gate's output is either at one or the other of two D.C. levels, depending upon the conditioning of the gate. One of the two D.C. levels represents a binary ZERO and the other D.C. level represents a binary ONE. The outputs of the four-legged AND gates 17 to 20 are connected to a buffer 24, such buffers also being known as OR gates, the output or OR gates 24 being coupled to an inverter 25 whose output in turn is connected to one input of AND gate 26. The other input to gate 26 is obtained from another AND gate 27 whose input 28 is energized to clock pulses and whose input 29 is adapted to receive gate inhibiting hold signals. The output of AND gate 26 is coupled to the reset (R) input of flip-flop 21. The output of buffer 24 is also coupled by line 30 to one input of AND gate 31. The other input to AND gate 31 is coupled by line 32 to the output of gate 27. Gate 31 is arranged so that a ZERO signal on line 30 inhibits the gate whereas a ONE signal conditions the gate to pass any coexistent clock pulse on line 32 to the set input of flip-flop 21. Gate 26 is arranged so that a ZERO signal from inverter 25 inhibits the gate whereas a ONE signal conditions the gate to pass clock pulses to the reset input of the flip-flop.

To illustrate the operation of the logical arrangement, assume a combination of inputs to gates 17, 18, 19, 20 conditioning any one of those gates so that its output is a ONE prior to or at the time a clock pulse is impressed at terminal 28 and assume that gate 27 is uninhibited so that the clock pulse is able to pass through it. The ONE signal is passed through buffer 24 to inverter 25 where the ONE signal is inverted and emerges as a ZERO. The emergent ZERO signal inhibits gate 26 and prevents the clock pulse on line 32 from passing through to the reset input of flip-flop 21. The ONE signal from gate 24 is also impressed upon line 30. The ONE signal, therefore, energizes one of the inputs of AND gate 31 so that the gate is conditioned to pass the clock pulse on line 32. The clock pulse passing through gate 31 "sets" the flip-flop 21 if it had been previously "reset," or leaves it "set" if it has previously been "set." When the flip-flop is "set," the assertion output at terminal 22 is active, that is the assertion output is a ONE and the negation output is inactive, i.e., a ZERO. As long as the input signal to gate 31 is a ONE at clock time, the gate is conditioned to pass the clock pulse, the flip-flop remains "set," and the assertion output at terminal 22 remains a ONE while the negation output remains a ZERO.

When the combination of inputs to gates 17 to 20 condition all those gates so that their outputs are ZEROS prior to or at clock time, the input to OR gate 24, is a ZERO and through the action of inverter 25, the ZERO emerges from the inverter as a ONE. The ZERO passing along line 30 inhibits gate 31 so that the clock pulse cannot pass through that gate. The ONE signal from the inverter conditions gate 26 so that it passes the clock pulse on line 32 to the reset input of flip-flop 21. If the flip-flop was previously reset it remains in that state. However, if the flip-flop was previously set, the actuation of the reset input causes the flip-flop to change states, whereupon the negation output becomes a ONE and the assertion output becomes a ZERO.

Turning now to FIG. 2, there is shown a schematic diagram of an arrangement embodying the invention. Input AND gate 17 consists of four diodes D1 to D4, each diode being connected between an input terminal 1, 2, 3, or 4 and the base of a PNP transistor Q1. Similarly each of the other input AND gates 18, 19, and 20 consists of four diodes, each diode, D5 through D16, being connected between its respective input terminal, 5 through 16, the base of a PNP transistor Q2, Q3, or Q4. The bases of transistors Q1, Q2, Q3, and Q4 are connected through resistors R1, R2, R3, and R4, respectively, to a source 42 of negative potential (−12 volts) and the collectors of those transistors are connected by a common load resistor R5 to a terminal 43 at which a negative voltage (−12 volts) is impressed. A transistor Q5 has its collector similarly connected to terminal 43 by a load resistor R6. The emitters of transistors Q1 through Q5 are connected at a junction 44 to the output of a pulse amplifier 45, the amplifier being excited by each clock pulse impressed at terminal 46. Transistor Q5 has its base connected to a source 47 of bias potential, −2.5 volts for example. A source 48 of positive voltage (+12 volts) is connected by a resistor R9 of high ohmic value to the emitters of transistors Q1 to Q5. In order to prevent the gates 17, 18, 19, and 20 from affecting one another, the bases of transistors Q1, Q2, Q3, and Q4 are coupled respectively by diodes D21, D22, D23, and D24, to the source 48 by a common resistor R8. Flip-flop 21 has its set input (S) connected by capacitor C2 to the collectors of transistors Q1 to Q4, while the reset input (R) of the flip-flop is coupled by capacitor C3 to the collector of transistor Q5.

The operation of the circuit of FIG. 2 is such that in the interval between clock pulses, i.e., in the absence of an output current pulse from amplifier 45, the stray and junction capacities of transistors Q1 to Q5 become charged in advance of the next clock pulse. No appreciable emitter curent flows during this interval because of the large ohmic value of resistor R9 so that the transistors are effectively cut-off and only minimal input power is required. Any current flowing in the emitters of transistors Q1, Q2, Q3, Q4, and Q5, in the absence of a current pulse from amplifier 45, must pass through resistor R9.

Since the four AND gates 17, 18, 19, 20 are identical in construction and operation, in order to simplify the exposition of the invention, the explanation of the invention's operation treats only with gate 17. When amplifier 45 emits a current pulse, that pulse must flow through either or both of transistors Q1 and Q5. The current pulse will flow through that one of the two transistors whose base is the more negatively biased. Transistors Q1 and Q5 are, in effect, coincidence gates, each gate having two inputs, one input being applied at the base and the other input being applied at the emitter.

The signals applied to input terminals 1 to 4 of AND gate 17 can assume one of two stable D.C. levels, typical levels being 0 volts and −4 volts. A 0 volt input signal will be referred to in binary parlance as a ZERO whereas a −4 volt input signal will be referred to as a ONE. In order for gate 17 to be activated, all the inputs 1 to 4 must be ONE signals. Where any input is a ZERO, the base of transistor Q1 is held at 0 volts causing the ONE signals applied to the other input terminal to hold their respective diodes non-conducting. Thus, the base of transistor Q1 will be at 0 volts if any input impressed at terminals 1 to 4 is a ZERO. Where the input signal at terminal 1, for example, is a ZERO and the signals at the other terminals 2, 3, 4, are ONES, junction 53 is clamped by diode D1 to the 0 volt input and diodes D2, D3, and D4 are held nonconducting.

It is assumed the condition of the circuit immediately before clock time is that the base of Q1 is at 0 volts and the base of Q5 is at the potential of terminal 47, that is, at —2.5 volts. When the clock pulse is impressed at terminal 46, amplifier 45 emits a current pulse which must flow through either or both of transistors Q1 and Q5. The current pulse will flow through that one of the two transistors whose base is the more negatively biased. Hence, since the base of transistor Q1 is held at 0 volts by a ZERO input signal, the current pulse provided by amplifier 45 flows through transistor Q5 because the base of that transistor is maintained at —2.5 volts. The current flowing through transistor Q5 causes a pulse to be transmitted through capacitor C3 to the reset input of flip-flop 21. Where flip-flop 21 was originally in the "set" state, the pulse coupled through capacitor C3 causes the flip-flop to change to its reset state. If the flip-flop was originally in its reset state, the pulse from capacitor C3 does not affect the flip-flop and it remains in its original state.

Assume now that after the clock pulse which reset flip-flop 21, inputs 1 to 4 all become ONES, so that gate 17 is reconditioned. Diodes D1 through D4 become conducting when the inputs fall to —4 volts causing the voltage at junction 53 to be held at —4 volts. Since the base of transistor Q5 is held at —2.5 volts, transistor Q1 is more forwardly biased than transistor Q5 when the next clock pulse arrives at terminal 46. In response to the clock pulse, pulse amplifier 45 puts out a current pulse which flows through transistor Q1 and a trigger pulse results at the collector. The trigger pulse is coupled through capacitor C2 to the set input of flip-flop 21 and causes the flip-flop to change states. If the flip-flop had originally been in the set state, the pulse from capacitor C2 would not have affected the flip-flop and it would have remained in its original state.

While a preferred embodiment of the invention is illustrated in FIG. 2 of the drawings and has been described herein, modifications which do not depart from the essence of the invention may be made and indeed, are apparent to those knowledgeable in the electronic art. For example, it would be a simple matter to use NPN transistors in place of PNP transistors or to use a different type of input gate. Therefore, it is intended that the invention not be limited to the precise arrangement which is illustrated but rather that the scope of the invention be construed in accordance with the appended claims.

What is claimed is:

1. A logical arrangement comprising:
 a bistable element having set and reset inputs, the bistable element providing output signals indicative of the stable state in which it then resides;
 an input gate having a plurality of signal input terminals, the input gate impressing one or the other of two potential levels on the base of a first transistor in accordance with the conditioning of the gate by the signals applied to the input terminals;
 means connecting the output of the first transistor to one input of the bistable element;
 a second gating transistor having its output connected to the other input of the bistable element;
 means for simultaneously applying a current pulse to the first and second transistors;
 and means for biasing the base of the second transistor at a potential intermediate the two potential levels whereby the current pulse passes through the first transistor when it is more forwardly biased than the second transistor and the current pulse passes through the second transistor when it is more forwardly biased than the first transistor.

2. Universal logic circuit package comprising:
 input gate means providing output signals of either a first or second level according to the conditioning thereof;
 a flip-flop for providing output signals of said package and having set and reset inputs;
 a first coincidence gate having its output coupled to one of said flip-flop inputs;
 at least a second coincidence gate having its output coupled to the other of said flip-flop inputs;
 means for simultaneously impressing a clock pulse directly upon respective inputs of both of said input gates;
 means for so coupling another input of said first coincidence gate to said output signals of said input gate means that said first coincidence gate is biased by one of said first and second levels for passing said clock pulse to said flip-flop input and is biased by the other of said first and second levels for preventing passage of said pulse to said one input of said flip flop; and
 means for impressing upon another input of said second coincidence gate a reference bias at a level intermediate said first and second levels so that when said first coincidence gate is biased for preventing passage of said pulse said second coincidence gate is biased by said reference bias for passing said clock pulse to said other input of said flip-flop and when said first coincidence gate is biased by said one of said levels for passing said clock pulse said second coincidence gate is biased for preventing passage of said clock pulse to said other of said flip-flop inputs.

3. A logical circuit package as defined in claim 2 wherein said input gate means comprises a plurality of AND gates, and including means for buffering said AND gates together for providing said output signals of either said first or second level.

4. A logical arrangement comprising:
 a flip-flop having set and reset inputs;
 at least one input gate adapted to provide an output of one of two levels of biasing signals selectively according to the condition of said gate;
 a first transistor having its collector coupled to one of said flip-flop inputs;
 a second transistor having its collector coupled to the other of said flip-flop inputs, and having its base connected to the output of said gate;
 means for biasing the base of said first transistor at a value between the two output levels of said gate;
 the emitters of both transistors being connected to one another;
 means for impressing a clock pulse upon said emitters; and means for forwardly biasing said collectors.

References Cited in the file of this patent

UNITED STATES PATENTS

| | | |
|---|---|---|
| 2,816,237 | Hageman | Dec. 10, 1957 |
| 2,880,317 | Vaughan | Mar. 31, 1959 |
| 2,903,606 | Curtis | Sept. 8, 1959 |
| 2,906,894 | Harris | Sept. 29, 1959 |
| 2,939,969 | Kwap et al. | June 7, 1960 |
| 2,950,461 | Tryon | Aug. 23, 1960 |

FOREIGN PATENTS

| | | |
|---|---|---|
| 209,009 | Australia | Jan. 20, 1956 |